(12) United States Patent  (10) Patent No.: US 7,478,274 B2
Nishida et al.  (45) Date of Patent: Jan. 13, 2009

(54) DUPLEX SYSTEM

(75) Inventors: Jun Nishida, Tokyo (JP); Toshio Hatano, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 424 days.

(21) Appl. No.: 11/396,076

(22) Filed: Mar. 30, 2006

(65) Prior Publication Data

US 2006/0221817 A1  Oct. 5, 2006

(30) Foreign Application Priority Data

Mar. 31, 2005  (JP)  ............................. 2005-104530

(51) Int. Cl.
*G06F 11/00*  (2006.01)
(52) U.S. Cl. .................. 714/11; 714/4; 714/6; 714/12; 714/13; 714/52; 714/749; 713/375
(58) Field of Classification Search ...................... 714/6, 714/11–13, 52, 749; 713/375
See application file for complete search history.

(56) References Cited

U.S. PATENT DOCUMENTS

| 5,502,733 | A | * | 3/1996 | Kishi et al. | ................. | 714/748 |
| 5,612,947 | A | * | 3/1997 | No | ............................. | 370/228 |
| 5,751,955 | A | * | 5/1998 | Sonnier et al. | ................ | 714/12 |
| 7,082,548 | B2 | * | 7/2006 | Nakano | .......................... | 714/6 |
| 7,162,545 | B2 | * | 1/2007 | Sudo | .......................... | 709/201 |
| 2002/0120903 | A1 | * | 8/2002 | Sudo | .......................... | 714/781 |
| 2003/0091059 | A1 | * | 5/2003 | Pike | ........................... | 370/462 |
| 2003/0188126 | A1 | | 10/2003 | Sudo | | |
| 2006/0005102 | A1 | * | 1/2006 | Scaglione et al. | .......... | 714/758 |
| 2006/0221817 | A1 | * | 10/2006 | Nishida et al. | ............. | 370/216 |
| 2006/0236199 | A1 | * | 10/2006 | Seo | ........................... | 714/758 |

FOREIGN PATENT DOCUMENTS

| JP | 05-204880 | 8/1993 |
| JP | 7-36720 | 2/1995 |
| JP | 2003-288228 | 10/2003 |

OTHER PUBLICATIONS

Copy of Japanese Office Action dated Jul. 2, 2007.

* cited by examiner

*Primary Examiner*—Emerson C Puente
(74) *Attorney, Agent, or Firm*—John J. Penny, Jr.; Edwards Angell Palmer & Dodge LLP

(57) ABSTRACT

A duplex system has duplicated processor devices. Each of the processor devices has a first copying section which writes data written in a memory of the processor device, into a same address of a memory of the other processor device, a second copying section which divides all data in the memory of the processor device to sequentially write all data into the memory of the other processor device periodically, an error detecting section which checks the data written in the memory of the processor device, and an error check register which sets an error bit when the error detecting section detects an error. After the first copying section and the second copying section write data into a memory of the standby side processor device, the control side processor device checks an error bit of an error check register of the standby side processor device.

8 Claims, 4 Drawing Sheets

DUPLEX SYSTEM

CROSS-REFERENCE TO RELATED APPLICATIONS

This application is based upon and claims the benefit of priority from the prior Japanese Patent Applications No. 2005-104530, filed on Mar. 31, 2005, the entire contents of which are incorporated herein by reference.

BACKGROUND OF THE INVENTION

1. Field of the Invention

The present invention relates to a duplex system which is applied to a safety system, and more particularly to a duplex system in which the validity of a security system is improved.

2. Description of the Related Art

In the field of a processor device which may be applied to a distributed control system that performs process control, and the like, a duplex system is widely in practical use in which processor devices for performing process control calculation are duplicated in order to enhance availability, and one of the processor devices is on standby for a failure of the other processor device.

FIG. 3 is an operation diagram of a related-art duplex system at the start of duplication.

Duplication is initiated by activation of a standby side processor device 20 during operation of a control side processor device 10.

A memory 11 of the control side processor device 10 stores a logic engine 12 and an OS 13. The logic engine 12 repeatedly executes at constant intervals a process in which a data of an input module 30 is read and control calculation is performed via the OS 13, and thereafter output data is written into an output module 40 via the OS 13.

When the standby side processor device 20 is activated, the control side processor device 10 knows the activation of the standby side processor device 20, and enables first copying section 14 of the control side processor device 10.

When the first copying section 14 is enabled, data which is written into the memory 11 by a processor (not shown) of the control side processor device 10 is written to the same address of a memory 21 of the standby side processor device 20.

The OS 13 of the control side processor device 10 executes a process in which all data on the memory 11 of the control side processor device 10 are gradually sequentially copied at constant intervals to the memory 21 of the standby side processor device 20 by second copying section.

In this way, at the timing when the copy process is done on all the area of the memory by the first and second copying section 14, 15 which copy the memory 11 of the control side processor device 10 to the standby side processor device 20, the contents of the memory 21 of the standby side processor device 20 coincide with those of the memory 11 of the control side processor device 10.

FIG. 4 is an operation diagram of synchronization of the related-art duplex system.

As a result of the process of FIG. 3, the contents of the memory of the control side processor device 10 are identical with those of the memory of the standby side processor device 20.

The OS 13 of the control side processor device 10 reads data from the input module 30. An OS 23 of the standby side processor device 20 copies the data which is read by the OS 13 of the control side processor device 10, to the memory 21 of the standby side processor device 20. The OSs 13, 23 on the both sides transmit the same data to the logic engines 12, 22.

Since the memory data of the control side processor device 10 and the standby side processor device 20 are identical with each other, the logic engines 12, 22 on the both sides perform the same calculation process. At this time, in order to cause the calculation process on the both sides to operate in the same sequence at the same timing, the OSs 13, 23 on the both sides execute a synchronizing process of queuing with each other, each time when the logic engines 12, 22 call the respective OSs. As a result of the synchronizing process, the calculation process performed by the logic engine 12 of the control side processor device 10 is identical in sequence and timing with that performed by the logic engine 22 of the standby side processor device 20.

As a result of the above, the logic engines 12, 22 on the both sides output the same calculation result. Therefore, the OS 23 of the standby side processor device 20 is not required to write output data into the output module 40, and only the OS 13 of the control side processor device 10 executes an output to the output module 40.

When the control side processor device 10 is stopped because of any reason such as a hardware failure, a control right is switched to the standby side processor device 20, a calculation result which ought to have been output by the stopped control side processor device 10 is continuously output to the output module 40.

Even when one of the processor devices is stopped, therefore, the input/output modules 30, 40 and the control calculation are not stopped as a whole, and high availability as a controller is ensured.

For example, JP-A-7-36720 discloses the configuration of a convention duplex system.

JP-A-7-36720 is referred to as a related art.

In the case where the related-art example shown in FIGS. 3 and 4 is applied to a safety system, there arise the following problems.

When the contents of the memory 11 of the control side processor device 10 are to be copied to the memory 21 of the standby side processor device 20, the possibility that erroneous data are copied to the standby side because of a failure of a hardware portion which executes the operation of copying data must be reduced as compared with a conventional control system.

When the OS 23 of the standby side processor device 20 is to copy data of the input module 30 from the control side and transfer the data to the logic engine 22, the possibility that erroneous data which are different from those of the control side are switched to the standby side because of a failure of a hardware which relates to this process must be reduced as compared with a related-art control system.

Furthermore, the possibility that the synchronizing process between the control side processor device 10 and the standby side processor device 20 malfunctions because of a failure of a hardware which relates to the synchronizing process, and the sequence and timing of the calculations of the logic engines 12, 22 on the control and standby sides are deviated must be reduced as compared with a related-art control system.

In these cases, during a period when the control side processor device 10 operates, only the control side performs the output to the output module 40. In the period, therefore, there arises no problem. The possibility that, as soon as the control side is stopped, erroneous data which lack sequence are output to the output module 40 by the standby side must be reduced as compared with a related-art control system.

SUMMARY OF THE INVENTION

An object of the invention is to provide a duplex system in which, when a hardware failure occurs, the failure is detected, erroneous data are not used, and the validity of data to be used is enhanced.

The invention provides a duplex system having duplicated processor devices, in which one of the processor devices is a control side processor device which controls an input module and an output module, and the other of the processor devices is a standby side processor device, wherein each of the processor devices has: a first copying section which writes data written in a memory of the processor device, into a same address of a memory of the other processor device; a second copying section which divides all data in the memory of the processor device to sequentially write all data into the memory of the other processor device periodically; an error detecting section which checks the data written in the memory of the processor device; and an error check register which sets an error bit when the error detecting section detects an error, and after the first copying section and the second copying section write data into a memory of the standby side processor device, the control side processor device checks an error bit of an error check register of the standby side processor device.

In the duplex system, before the first copying section and the second copying section write data into the memory of the standby side processor device, the control side processor device clears the error bit of the error check register of the standby side processor device, and after the data is written into the memory of the standby side processor device, the control side processor device checks the error bit.

In the duplex system, when the error bit of the error check register of the standby side processor device is set, the control side processor device starts again from a beginning to write data by the first copying section and the second copying section.

In the duplex system, the input module adds a data check code to input data to be transmitted to the control side processor device and the standby side processor device, and each of the processor devices receives data from the input module, and checks a received data check code and a data check code produced from the received data.

In the duplex system, each of the processor devices adds a data check code to output data to be transmitted to the output module, and the output module receives data from the control side processor device and the standby side processor device, respectively, and checks a received data check code and a data check code produced from the received data.

In the duplex system, the data check code includes at least one of a CRC code and a sequence number.

In the duplex system, when a control right is switched from one of the processor devices to the other of the processor devices, the output module checks sequence of the sequence number of the received data.

According to the duplex system, the duplex system inherits the architecture of a related-art duplex mechanism, and the data error check code is disposed. Therefore, it is possible to achieve both high availability which is attained in the related-art duplex system, and the validity of data due to the error check code.

DETAILED DESCRIPTION OF THE PREFERRED EMBODIMENTS

An embodiment of the invention will be described in detail with reference to the accompanying drawings.

Figure 1:
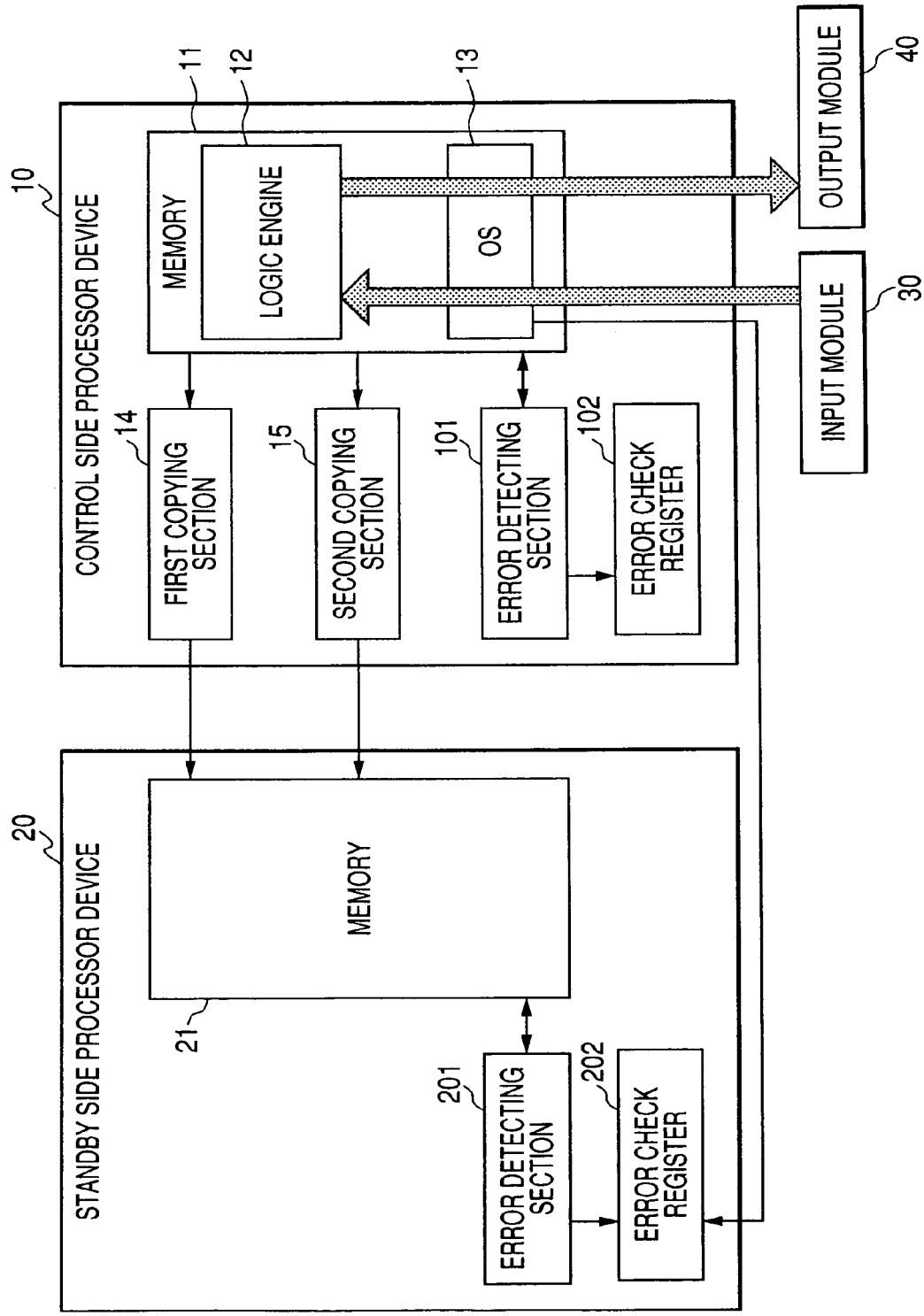
FIG. 1 is a diagram showing the configuration of an embodiment of the invention.

FIG. 1 is a diagram showing the configuration of an embodiment of the invention. The components identical with those of the aforesaid figures are denoted by the same reference numerals.

When error detecting section 201 detects an abnormality in data, the standby side processor device 20 sets an error bit in an error check register 202.

The control side processor device 10 clears the error bit of the error check register 202 in advance of starting copying to the memory 21 on the standby side, and checks whether or not the error bit is set after executing the copying process. If the error bit is set, it is assumed that the copying process failed.

When the control side processor device 10 detects a failure of copying, the standby side processor device 20 is caused to restart by itself, and performs again a process of initiating duplication.

Figure 2:
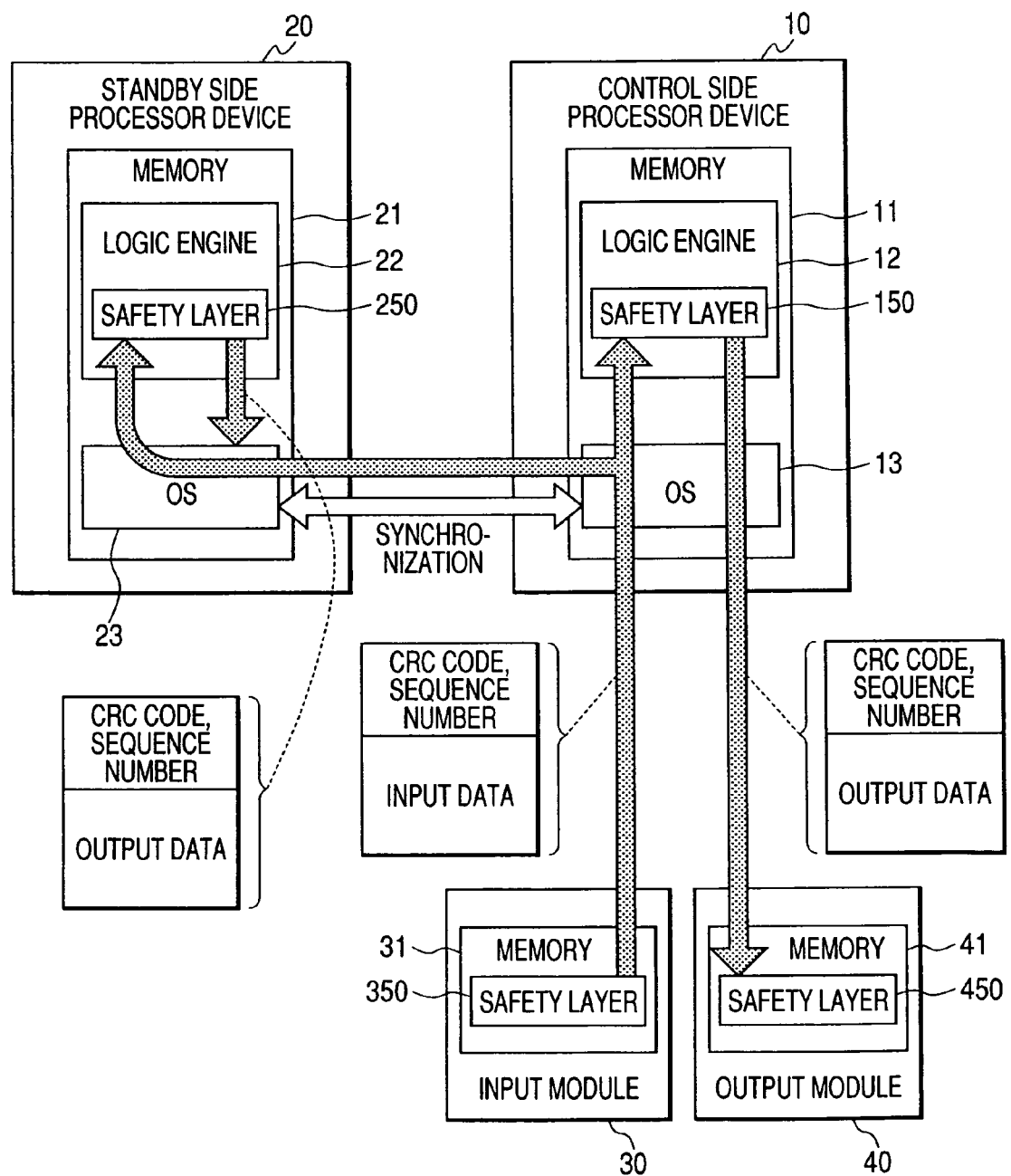
FIG. 2 is an operation diagram of synchronization in the invention.
Figure 3:
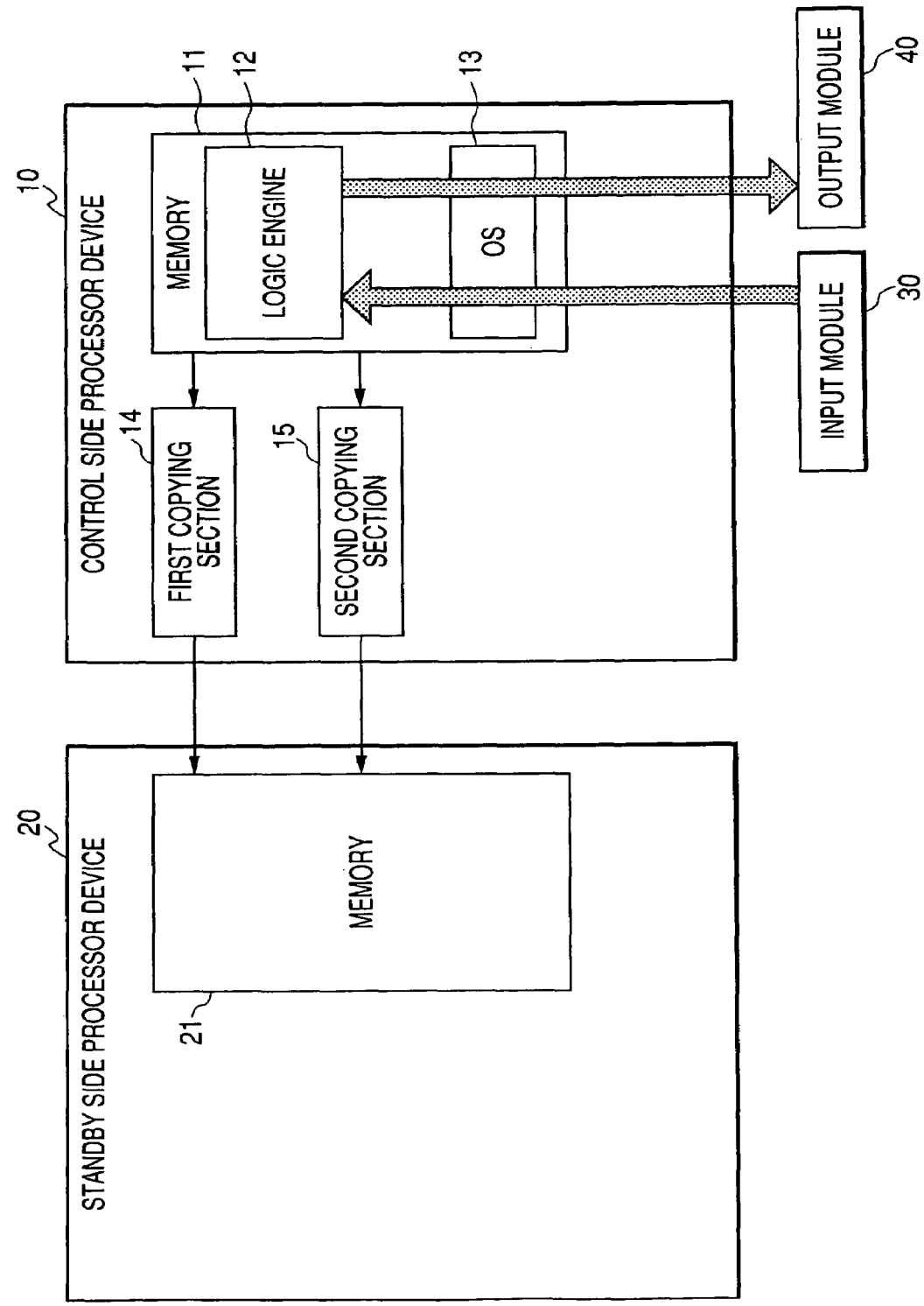
FIG. 3 is an operation diagram of a related-art duplex system at the start of duplication.
Figure 4:
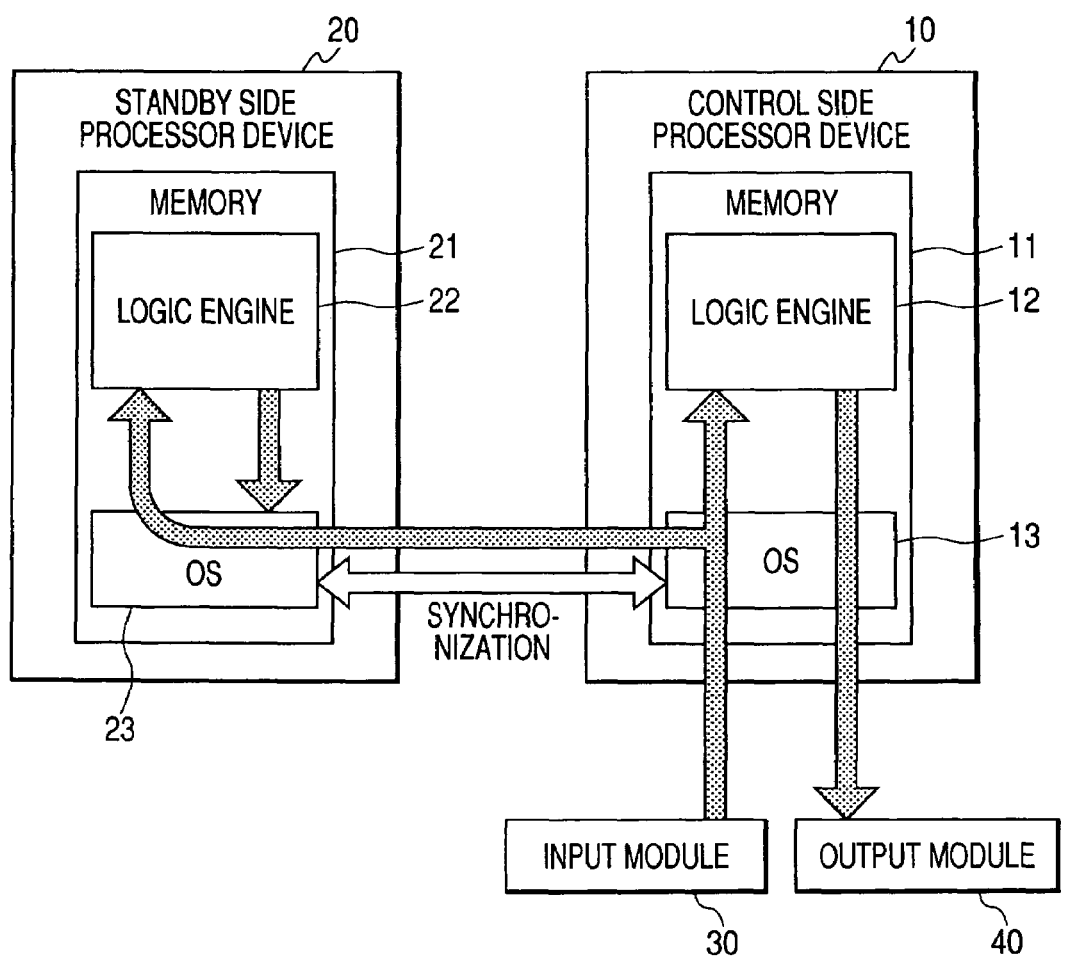
FIG. 4 is an operation diagram of synchronization of the related-art duplex system.

FIG. 2 is an operation diagram of synchronization in the invention.

Data communication between the input/output modules 30, 40 and the processor devices 10, 20 is done by Safety-Layers 150, 250, 350, 450 with using a data frame in which a CRC (Cyclic Redundancy Check) code and a sequence number are added as a data check code to data.

The input module 30 produces an input data frame in which a CRC code and a sequence number are added to input data. The input data frame is read out by the logic engines 12, 22 on the both sides via the OSs 13, 23.

Each of the logic engines 12, 22 compares the CRC code added to the input data with a CRC value which is calculated from the data itself, by means of an internal process to check whether an error is included in the read data or not.

Furthermore, the sequence number is checked to see whether the data is read in a wrong sequence or not.

If an error is detected, it is determined that the data is abnormal, and an input data abnormality process such as transmission of an alarm, and an abnormality output is performed.

As a result of the above, the validity of input data to the standby side processor device 20 from the input module 30 is guaranteed, and it is possible to prevent the system from operating with using erroneous data when a control right is switched from the control side to the standby side because of a cause such as a hardware failure in the control side.

The processor devices 10, 20 produce output data frames in which a CRC code and a sequence number are added to output data, and output the output data frames to the OSs 13, 23.

The control side processor device 10 writes the data into the output module 40. The output module 40 compares the CRC code added to the received output data with a CRC value calculated from the data itself, by means of an internal process to check whether an error is included in the written data or not.

Furthermore, the sequence number is checked to see whether the data is written in a wrong sequence or not.

If an error is detected, an action indicating abnormality is performed.

In the case where synchronization between the control side processor device 10 and the standby side processor device 20 does not normally operate, for example, the sequence numbers of the output data frames respectively produced by the control side processor device 10 and the standby side processor device 20 do not coincide with each other. Also in this case, there arises no problem unless the control side is stopped. By contrast, when the control side is stopped by a hardware failure on the control side or a like cause, the output data on the standby side is output to the output module. At this timing, the output module 40 checks the sequence number of the received output data frame. If abnormality is detected, the output data is not used, and the output module 40 performs an action on abnormality.

As a result, even when synchronization between the logic engines 12, 22 on the both sides does not normally operate, its abnormality can be detected at the timing when the control right is switched. Therefore, it is possible to prevent the system from operating with using an erroneous data.

In the above, the example in which the CRC code and the sequence number are used as the data check code has been described. Alternatively, the source and destination addresses of data, the types of the input/output modules, and the like may be used.

What is claimed is:

1. A duplex system comprising duplicated processor devices, in which one of the processor devices is a control side processor device which controls an input module and an output module, and the other of the processor devices is a standby side processor device, wherein each of the processor devices comprises:

a first copying section which writes data written in a memory of the processor device, into a same address of a memory of the other processor device;

a second copying section which divides all data in the memory of the processor device to sequentially write all data into the memory of the other processor device periodically;

an error detecting section which checks the data written in the memory of the processor device; and an error check register which sets an error bit when the error detecting section detects an error, and after the first copying section and the second copying section write data into a memory of the standby side processor device, the control side processor device checks an error bit of an error check register of the standby side processor device.

2. The duplex system according to claim 1, wherein before the first copying section and the second copying section write data into the memory of the standby side processor device, the control side processor device clears the error bit of the error check register of the standby side processor device, and after the data is written into the memory of the standby side processor device, the control side processor device checks the error bit.

3. The duplex system according to claim 1, wherein when the error bit of the error check register of the standby side processor device is set, the control side processor device starts again from a beginning to write data by the first copying section and the second copying section.

4. The duplex system according to claim 1, wherein the input module adds a data check code to input data to be transmitted to the control side processor device and the standby side processor device, and each of the processor devices receives data from the input module, and checks a received data check code and a data check code produced from the received data.

5. The duplex system according to claim 4, wherein the data check code includes at least one of a CRC code and a sequence number.

6. The duplex system according to claim 1, wherein each of the processor devices adds a data check code to output data to be transmitted to the output module, and the output module receives data from the control side processor device and the standby side processor device, respectively, and checks a received data check code and a data check code produced from the received data.

7. The duplex system according to claim 6, wherein the data check code includes at least one of a CRC code and a sequence number.

8. The duplex system according to claim 7, wherein when a control right is switched from one of the processor devices to the other of the processor devices, the output module checks sequence of the sequence number of the received data.

* * * * *